A. C. PANCOAST.
CULINARY SEPARATING MACHINE.
APPLICATION FILED JAN. 31, 1910.
1,015,337.
Patented Jan. 23, 1912.
4 SHEETS—SHEET 2.
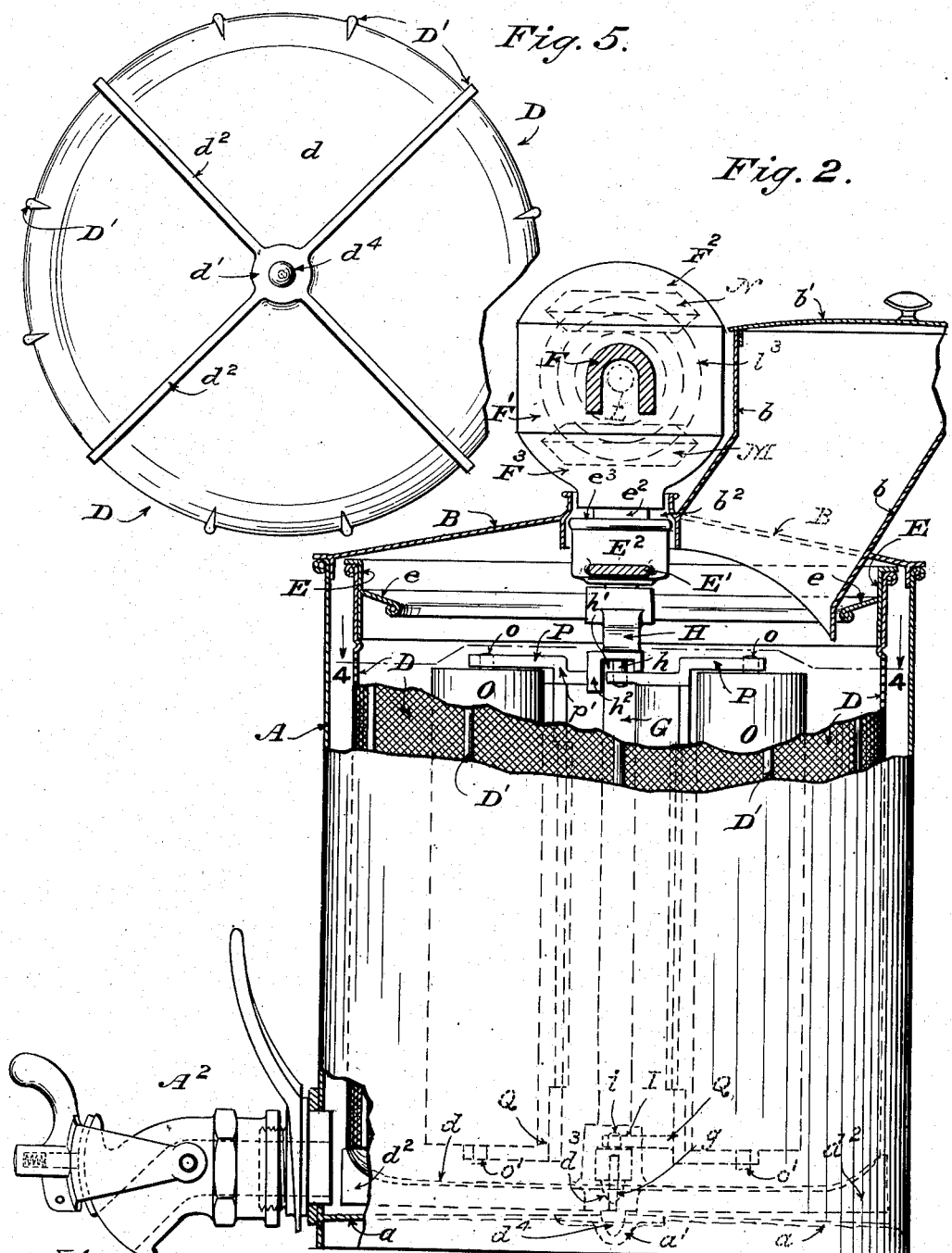

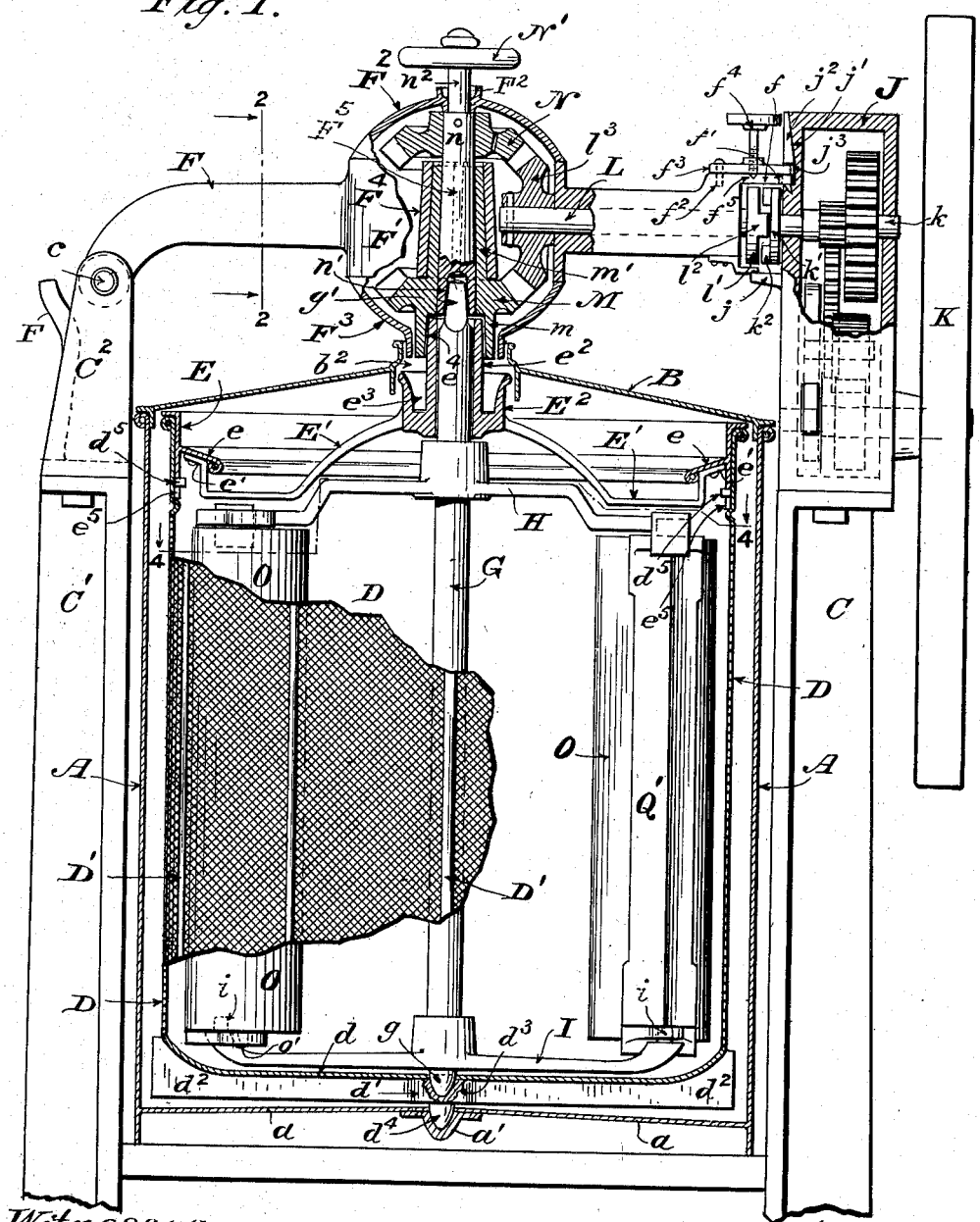

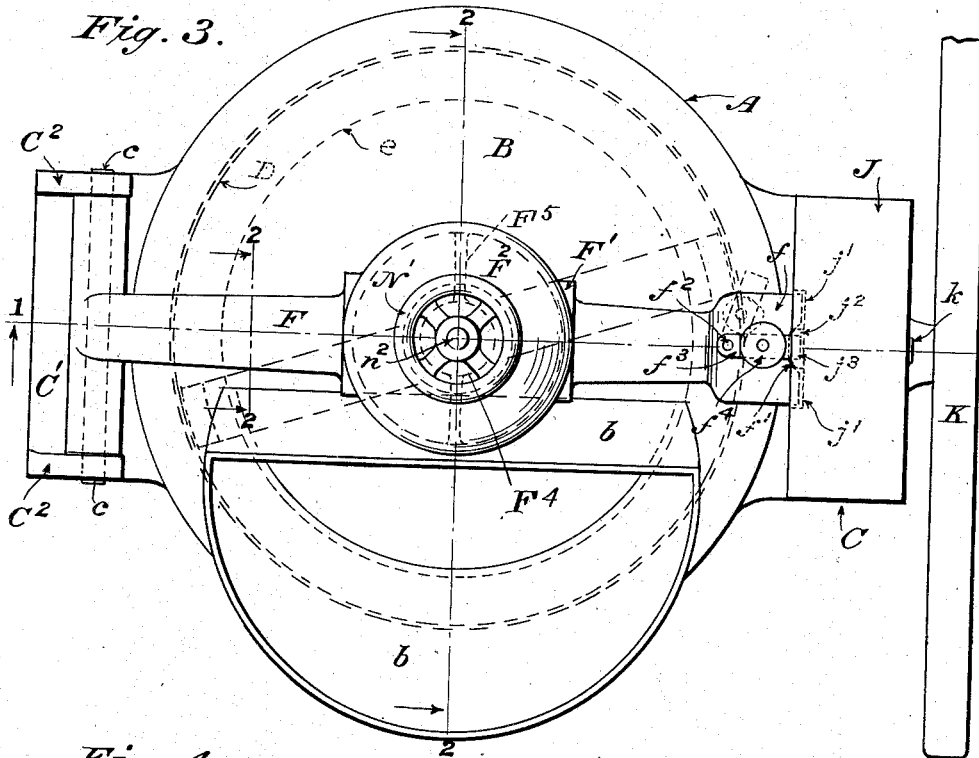
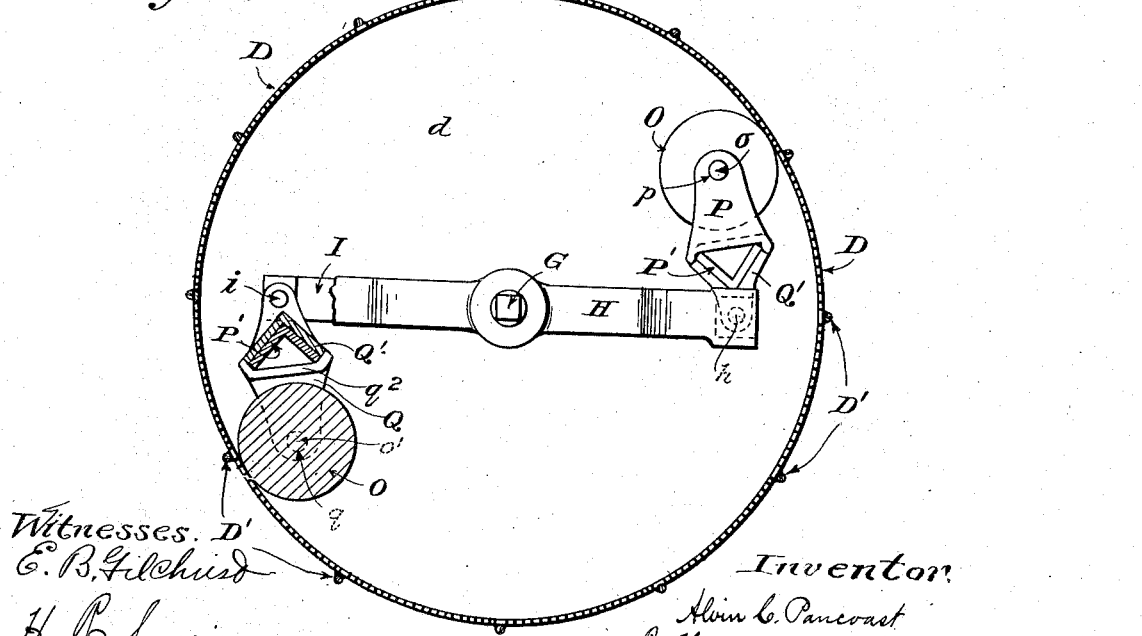

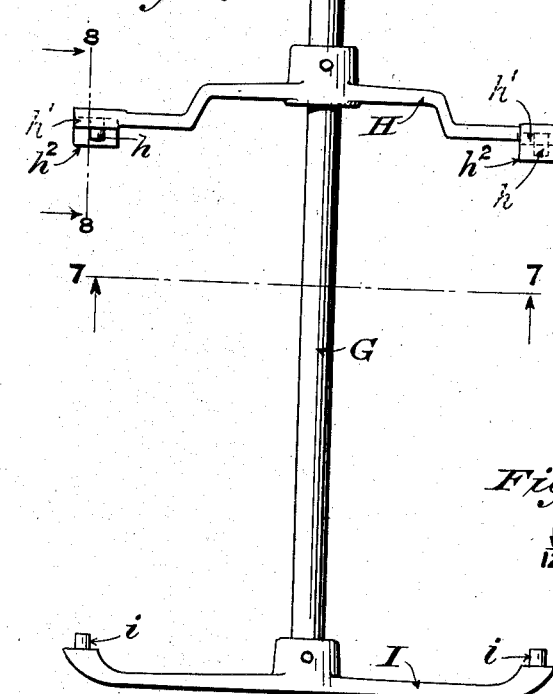

UNITED STATES PATENT OFFICE.

ALVIN C. PANCOAST, OF CLEVELAND, OHIO, ASSIGNOR OF ONE-FOURTH TO WILLIAM G. PANCOAST, OF EAST CLEVELAND, OHIO.

CULINARY SEPARATING-MACHINE.

1,015,337.  Specification of Letters Patent.  Patented Jan. 23, 1912.

Application filed January 31, 1910. Serial No. 540,966.

*To all whom it may concern:*

Be it known that I, ALVIN C. PANCOAST, a citizen of the United States, residing at Cleveland, in the county of Cuyahoga and State of Ohio, have invented a certain new and useful Improvement in Culinary Separating-Machines, of which the following is a full, clear, and exact description.

The object of this invention is to produce certain new and useful improvements in culinary utensils.

The invention relates to culinary vessels equipped with mechanism adapted to crush, mash, mix or agitate and separate or strain off the juices or liquid portions of food stuffs from the more solid matters containing them as may be required in the preparation of various articles for edible consumption, such as the mashing of potatoes or the like or the mashing of fruits and separating or straining of their juices or the extraction of soup materials, either meat juices or thin vegetable preparations all in a practically continuous operation. It is adapted for all of these uses in the precise form shown and with slight changes or modifications might readily be adapted for other analogous uses.

An important feature of the invention lies in such construction of its detachable parts or members that it may be quickly and easily taken apart and every portion or surface of every member made readily accessible for thorough cleansing.

In the drawings which show the invention in its now preferred form of details and general assemblage of parts, Figure 1 is a side elevation, partly in section on the line 1—1 of Fig. 3, of a device embodying the essential features of the invention. Fig. 2 is a similar view, taken at a right angle to Fig. 1, partly in section on the lines 2—2 of Figs. 1 and 3. Fig. 3 is a plan view with cover of feed hopper removed. Fig. 4 is a horizontal section on the line 4—4 of Figs. 1 and 2. Fig. 5 is an inverted view of the bottom of the strainer vessel. Fig. 6 is a side elevation of the main driving shaft and the cross arms carried thereby. Fig. 7 is an inverted or bottom plan view of the upper cross arm, showing the shaft in section on the line 7—7 of Fig. 6. Fig. 8 is a side elevation of one of the centrifugal crushing rollers and its supports, detached and partly broken away and partly in section on the lines 8—8 of Figs. 6 and 7. Fig. 9 is a side elevation of one of the V sectioned members of the vertical bars of the roller frame. Fig. 10 is a section of the same on the line 10—10 of Fig. 9. Fig. 11 is a similar view to Fig. 9 of the other V sectioned member of the vertical bar. Fig. 12 is a section of the same on lines 12—12 of Fig. 11. Fig. 13 is an elevation of a portion of the vertical flange of an annular supporting ring carried at the top of the strainer vessel and secured by "bayonet joint" connection to said vessel.

Referring to the parts by letters, A is a tight cylindrical outer vessel having a conically inclined tight bottom $a$, to the high center of which is secured a central step bearing $a'$. It is also provided with a suitable faucet $A^2$ whereby its contents may be drawn off as desired. A removable cover B closes the top of this vessel and it is provided, at one side, with a feed hopper $b$ of such considerable dimensions as will admit of the passage of large potatoes, apples, etc. A loose cover $b'$ closes the top of the hopper. The vessel A is suitably mounted and supported in a framework having rigid standards C, C' at opposite sides of the vessel to support certain driving mechanism and gears to be hereinafter described; the cover B having a central aperture $b^2$ for the passage of portions of this mechanism.

Within the vessel A is a rotatable cylindrical strainer vessel D, the side walls of which are mainly composed of finely perforated metal sheets, fine screens, or wire gauze, to constitute a strainer sieve through which the desired products are forced. These walls are reinforced on their exterior side by small vertical ribs D'. The bottom $d$ is preferably solid, curved or dished up at its periphery, and provided on its lower side with a central boss $d'$ from which radiate depending fin blades or arms $d^2$ standing close above the bottom of the outer vessel A. In the top of this boss is a sunken step bearing $d^3$ while projecting from its bottom is a trunnion pin $d^4$ adapted to engage the step bearing $a'$ of the outer vessel.

At its upper end the strainer vessel D is provided with an inner annular band E, having an inclined flange $e$ to strengthen and stiffen it. This annular band E is removably secured to the strainer vessel D by bayonet slots $e^5$ (see Fig. 13) which engage rigid stud pins $d^5$ projecting inwardly from the surface of the vessel. See Fig. 1. A cross bar E' is secured by its feet $e'$ to the flange $e$ and is bowed up at its central portion and provided with a boss $E^2$ centrally bored to form a shaft bearing, and having a sleeve hub $e^2$ extending well above the top of the boss and squared at its upper end as at $e^4$. An oil-drip cup $e^3$ is formed about the lower portion of the sleeve to catch any lubricating oil dripping down from the gearing, etc. above it. A shaft G on the axis of the vessels A and D is supported by a trunnion pin $g$ at its lower end taking into the step bearing $d^3$ on the vessel D and at its upper end in the bearing boss $E^2$ of the cross bar E'. Cross arms H and I are rigidly secured upon the shaft G near its upper and lower ends respectively and they support crushing rollers in a manner that will presently be explained.

Upon the frame standard C' is secured a bracket between the ears $C^2$ of which an arm F is mounted upon a pivot pin $c$. This arm extends across the frame and its free end is connected to and supported by a gear casing J rigidly mounted on the top of the standard C. This arm rests upon a lug $j$ projecting from the gear casing. The upper side $f$ of the cross arm, at this end, projects beyond the lower side, is centrally notched as at $f'$ and is adapted to fall into undercut recesses $j'$ on the inner face of the gear casing. Between these recesses is a rib $j^2$ embraced by the notch $f'$ of the arm, and in this rib is formed a cross groove $j^3$ adapted to be engaged by a laterally swinging latch $f^3$ pivoted at $f^2$ on the arm F and provided with a pointed locking screw $f^4$ which engages an indentation $f^5$ in the upper face of the arm. When the latch $f^3$ is swung to the straight position shown by full lines in Fig. 3, the arm F is locked, but when the latch is swung to the dotted position, this end of the arm is freed and may be raised off the step lug $j$.

The gear casing J incloses a train of wheels adapted to drive the final shaft $k$ through power from the fly wheel K which may be turned by hand crank or other power, as desired. The train of gearing is similar to that shown in Letters Patent No. 901,465 granted to me October 20, 1908, and it is not specifically claimed herein as a part of this invention. It is adapted to reverse the direction of revolution of the final shaft $k$ when desired. Upon the projecting end of the shaft $k$ is mounted a clutch disk $k'$ having a pair of clutch teeth $k^2$ set out near the periphery. A counter shaft L mounted in the arm F, to drive certain gearing carried thereby, is provided with a clutch disk $l'$ having teeth $l^2$ similar to those on the clutch disk $k'$ and adapted to pass through the opposing teeth of that disk when the arm F is being swung, but otherwise to engage them when the counter shaft L is to be operated.

At mid length of the cross arm F is formed a round open bracket or casing F' for the inclosure of a set of driving bevel gear wheels, the casing having detachable covers $F^2$ and $F^3$ suitably secured thereto. The counter shaft L projects into this casing and has a bevel wheel $l^3$ rigidly attached to it. This wheel engages a bevel wheel M having a lower hub in which is a square socket adapted to fit over the upper squared end $e^4$ of the sleeve hub $e^2$ on the cross arm E' on the strainer vessel, and impart rotary motion to said vessel. The wheel M has also a long upper sleeve hub $m'$ which has bearing in the central hub $F^4$ of an integral cross arm $F^5$ extending across the casing. See Figs. 1, 2 and 3. Another bevel wheel N engages the wheel $l^3$ and is rigidly secured on a short shaft $n$ rotatably mounted in the sleeve hub $m'$ of the lower bevel wheel $m$. This shaft has a square socket $n'$ at its lower end adapted to engage the squared upper end $g'$ of the shaft G and rotate it in an opposite direction to the rotation of the strainer vessel D. A reduced portion $n^2$ of the shaft $n$ extends through the top cover of the casing and carries a rigid hand wheel N' by means of which the shaft $n$ may be turned by hand to adjust the several square socket joints and also the clutch teeth $l^2$ when assembling the parts to operative positions.

By the just described arrangements of the parts the overhanging arm F may be lifted out of the way and the square socketed connections of the shaft G and the arm E' with their driving gears separated in about the same plane within the casing $F^2$ of the arm F. This removes all obstructions from above the cover B which may then be lifted off to afford free access to the interiors of the vessels A and D.

A rotatable carrying frame composed of the cross arms H and I rigidly fixed to the shaft G, is adapted to pivotally support centrifugal crushing rollers O having pins $o$, $o'$ on their ends which take into bearings $p$ and $q$ on the free ends of link members P and Q which are mounted on pivot pins $h$ and $i$ of the respective cross arms. The outer ends of these link members are offset as at $p'$ and $q'$ to give greater space between these outer ends for the rollers O. These link members are provided with connecting bars P' and Q' which stand at right angles to the link portions, and are generally V-shaped in cross section, (see Figs. 10 and 12), and so relatively proportioned that the smaller bar P' will fit or nest into the bar Q' as shown in Fig. 8 and by dotted lines in Fig. 12. At its extremities the bar Q' is provided with integral cross plates $q^2$, $q^2$ which for short distances inclose the outer open face of the V and are intended to hold the bar P' against displacement. These plates necessitate the telescopic assembling of the two bars, the bar P' slipping into the V recess of the bar Q' and inside of the plates $q^2$. These bars P' and Q' or at least one of them is long enough to limit the movement of the link members toward each other and hold them at proper distances apart to insure their suitable connection on the pivot pins $h$ and $i$ of the carrying frame.

It will be observed that when the parts are assembled the point of the V sectioned bar is in the front or advance face of the bar, thereby facilitating its progress through the mass of material in the strainer vessel to be operated upon. The pivot pins $h$ on the upper cross arm, project from recesses $h'$ formed above the general plane of the lower surface of the arm and bounded on one side by lugs or blocks $h^2$ extending below said general plane of the arm, (see Figs. 6, 7 and 8), said blocks being upon the advance or forward side of the arms with respect to their operative direction of rotation, these lugs also prevent setting arms in wrong direction. In assembling these parts the two bars P' and Q' are telescoped as described, their link members closing upon the ends of the rollers and engaging their bearing pins $o$, $o'$ as shown in Fig. 8. This group of parts which I will call the roller frame is then pivotally connected to the cross arms H and I by first engaging the link member P with the stud pin $h$ of the upper arm H, the link members P and Q for this operation being positioned in radial line with the cross arms so that the inner or pivoted end of the link member P will be in line to register with and sink into the recess $h'$ at the end of the arm H, thus allowing the roller frame to be raised sufficiently to permit of the lower link member Q being slipped upon the pin $i$ of the lower arm I. The roller frame is then lowered until link member Q rests upon the shoulder at the base of pin $i$, the upper pin $h$ being long enough to admit of this movement without disengaging it from the link member P. The roller frame is then turned to its operative position, shown by full lines in Figs. 4, 7 and 8, at nearly a right angle to the cross arms, in which position the upper surfaces of the link member P rest against the lower surface of the cross arm H and cannot, unless turned back, become disengaged from the pivot pin $h$. Otherwise cross arm I and the lower surface of the cross arm H are the same as that from outside to outside of the bearing faces of the link members P and Q, and this holds the roller frame against any escape from its pivot pins until it is again turned to position or register with the recess $h'$ of the upper arm where the link member P may be moved into it. These members of the roller frames must be assembled and pivotally mounted in the carrying frames H, I, before being placed in the strainer vessel D, their position in which prevents the roller frames from being turned to radial positions on the carrying frame and becoming disengaged from its pivot pins $h$ and $i$.

When the various elements are assembled as described, the driving mechanism and its gears rotate the strainer vessel D in one direction and the carrying frame G, H, I with its link supported rollers O in the opposite direction, the rotation of the carrying frame being sufficiently rapid to impart considerable centrifugal force to the rollers and press them against the oppositely moving walls of the strainer vessel. Any matter, vegetables, meats, fruits, etc., to be acted upon is fed into hopper $b$ and falling into vessel D is carried and held by centrifugal action against the strainer walls of said vessel. It is there pressed upon by the rollers O and either mashed and forced through the strainer, or it is crushed and its juices expressed and forced through the strainer, the pulp remaining in the vessel. The expressed juices or other matters are collected in the outer vessel A and there kept in a state of agitation by the fin blades $d$ on the bottom of the vessel D and by the slight ribs D' on its outer side walls. The products may be drawn off as desired through faucet A'.

The general arrangement and assembling of the several parts constitute an exceptionally useful culinary machine for the purposes mentioned, and the construction of its detailed parts admits of their being held in assembled positions without the use of bolts, screws, pins or similar small detachable devices. This facilitates the machine parts being disconnected for cleaning. All of the parts too are specially designed with open surfaces easily accessible for cleaning.

Having described my invention, I claim:—

1. In a utensil of the specified character, the combination of an outer receptacle, an inner cylindrical straining vessel closely fitting in the outer receptacle and adapted to rotate on a vertical axis, a carrying frame adapted to rotate on the same axis but in an opposite direction from the strainer vessel, with a plurality of vertical rollers link connected to the carrying frame and adapted to be pressed against the walls of the strainer vessel.

2. In a utensil of the specified character, the combination of an outer receptacle, an inner cylindrical strainer vessel closely fitting in the outer receptacle and adapted to rotate on a vertical axis, a carrying frame adapted to rotate on the same axis but in an opposite direction from the straining vessel, with a plurality of vertical rollers link connected to the carrying frame and adapted to be pressed by centrifugal force against the walls of the strainer vessel.

3. In a utensil of the specified character, the combination of an outer cylindrical receptacle, an inner cylindrical strainer vessel closely fitting in the outer receptacle and rotatable on a vertical axis, a carrying frame rotatable on the same axis, vertical rollers carried by said frame and adapted to yieldingly press against the inner walls of the strainer vessel with means for rotating the strainer vessel in one direction and the carrying frame in the other direction.

4. In a utensil of the specified character, the combination of an outer fixed receptacle, an inner cylindrical strainer vessel closely fitting in the outer receptacle and adapted to rotate on a vertical axis, a carrying frame adapted to rotate independently on the same axis, rollers carried by said frame and having rolling contact with the surrounding walls of the strainer vessel, with a step bearing in the outer receptacle to receive a trunnion of the strainer vessel and a step bearing in the strainer bearing to receive a trunnion of the carrying frame.

5. In a utensil of the specified character, the combination of an outer fixed receptacle, an inner cylindrical vessel having vertical strainer walls and a tight bottom which curves upwardly at its outer edge with fin blades or arms depending from the said bottom.

6. In a utensil of the specified character, the combination of an outer fixed receptacle, an inner cylindrical strainer vessel closely fitting in the outer receptacle and adapted to be rotated on its axis, vertical rollers adapted to be rolled against the inner walls of the strainer vessel and express the desired products through said walls, with projecting longitudinal ribs on the outer surface of the strainer vessel.

7. In a utensil of the specified character, the combination of an outer fixed receptacle, an inner rotatable strainer vessel supported on a step bearing in the outer vessel, a rotatable frame having a shaft rigidly connected thereto and supported on a step bearing in the strainer vessel, an arm extending over the said receptacle and the strainer vessel, means whereby the upper end of the said shaft is axially centered by said arm, an annular band detachably connected to the strainer vessel at its upper end, with a cross bar rigidly attached to said band and apertured for bearing upon said shaft.

8. In a utensil of the specified character, the combination of a rotatable strainer vessel, a shaft having a roller-carrying frame within the strainer vessel and adapted to be rotated independently, a cross bar connected to the strainer vessel and having a bearing for said shaft with overhead gear mechanism for rotating the strainer vessel and the shaft, and an annular oil receptacle on said cross bar concentric with the shaft bearing and adapted to protect food stuffs in the strainer vessel from lubricating oil.

9. In a utensil of the specified character, the combination of a rotatable frame comprising a shaft with two cross arms rigidly connected to it, opposed pivot pins on the ends of the respective arms, link members engaging said pivot pins, rollers mounted in the free ends of said link members, with slip jointed bars connecting said link members to hold them in proper relation and at suitable distances apart, substantially as described.

10. In a utensil of the specified character, the combination of a rotatable frame comprising a shaft with two cross arms rigidly connected to it, opposed pivot pins on the ends of the respective arms, link members engaging said pivot pins, rollers mounted in the free ends of the link members, said link members being connected by V sectioned bars telescopically joined together, substantially as described.

11. In a utensil of the specified character, the combination of a rotatable frame having rigidly fixed cross arms spaced apart, opposed pivot pins in the ends of the respective arms, a recess in the lower face of the upper arm extending to the end of the arm, the pivot pin of this arm standing in said recess, with link members adapted to engage said pivot pins, bars to connect and hold said link members at a distance apart equal to the distance between the opposed working faces of the fixed arms so that when being assembled the link members must be presented to the cross arms in line with the said recess in the upper arm, and when pivoted turned away from said recess opening to working position.

In testimony whereof, I hereunto affix my signature in the presence of two witnesses.

ALVIN C. PANCOAST.

Witnesses:
WM. A. SKINKLE,
H. R. SULLIVAN.